(12) United States Patent
Vestberg

(10) Patent No.: US 7,531,607 B2
(45) Date of Patent: May 12, 2009

(54) PROCESS FOR PRODUCING OLEFIN POLYMERS

(75) Inventor: Torvald Vestberg, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/582,781

(22) PCT Filed: Dec. 17, 2004

(86) PCT No.: PCT/FI2004/000778

§ 371 (c)(1),
(2), (4) Date: Jun. 13, 2006

(87) PCT Pub. No.: WO2005/058984

PCT Pub. Date: Jun. 30, 2005

(65) Prior Publication Data

US 2007/0149728 A1 Jun. 28, 2007

(30) Foreign Application Priority Data

Dec. 19, 2003 (EP) ................... 03396115

(51) Int. Cl.
C08F 4/649 (2006.01)
C08F 110/06 (2006.01)
C08F 210/06 (2006.01)

(52) U.S. Cl. ............ 526/125.3; 526/348; 526/351

(58) Field of Classification Search .......... 526/125.3, 526/348, 351
See application file for complete search history.

(56) References Cited

U.S. PATENT DOCUMENTS 7,078,468 B2 * 7/2006 Thorman .................. 526/124.3

FOREIGN PATENT DOCUMENTS

| WO | WO-95/21203 A | 8/1995 |
|----|---------------|--------|
| WO | WO-99/20663 A | 4/1999 |
| WO | WO-03/000754 A | 1/2003 |
| WO | WO-03/000757 A | 1/2003 |
| WO | WO-03/059966 A | 7/2003 |

* cited by examiner

*Primary Examiner*—Caixia Lu
(74) *Attorney, Agent, or Firm*—Birch, Stewart, Kolasch & Birch, LLP

(57) ABSTRACT

A process for producing at least two different propylene polymer grades, in which process the isotacticity of the polymer is changed while keeping the melt flow rate of the polymer at a predetermined level during a transition of production from a first polymer grade to a second. The process is carried out in a polymerization arrangement comprising at least one polymerization reactor, where propylene is polymerized, optionally with comonomers, under polymerization conditions in the presence of hydrogen as a molecular weight controlling agent and a Ziegler-Natta catalyst system. The catalyst system comprises a catalyst component and an external donor. During a transition of production from the first polymer grade to the second, the external donor is changed, but the hydrogen feed is kept at a predetermined level.

29 Claims, 1 Drawing Sheet

PROCESS FOR PRODUCING OLEFIN POLYMERS

BACKGROUND OF THE INVENTION

1. Field of the Invention

The present invention relates to olefin polymerization. In particular, the present invention concerns a process for polymerization of propylene in a polymerization reactor arrangement to produce at least two olefin polymers having essentially the same level of Melt Flow Rate but different isotacticity.

2. Description of Related Art

Polypropylenes are conventionally produced in the presence of a high-yield catalyst system comprising a catalyst component, a cocatalyst component and a compound acting as an external electron donor. The catalyst component is typically a supported Ziegler-Natta type catalyst containing magnesium, titanium and a halogen as essential components. Porous, inorganic or organic particulate carrier materials, such as silica or $MgCl_2$ supports, are used as support materials. The external electron donors present a means for controlling the isotacticity of the polymer.

For different applications, polymers with very different properties are required. The main characteristics of these polymers are their isotacticity and Melt Flow Rate, in the following also abbreviated "MFR". These features can be controlled by varying the process conditions and by using different catalyst systems. One important tool for adapting the properties of the polymers to varying product requirements is adjustment of hydrogen feed during polymerization. By varying of the feed of hydrogen, the molecular weight or MFR of the polymer can be controlled. The stiffness of the polymer is also an important product property, which should be adjusted depending on the end use of the polymer. Stiffness is greatly dependent on the isotacticity of the polymer and, thus, isotacticity has to be set at the desired, predetermined level. This is typically done by proper selection of the external donors used in the polymerization process.

It is commonly known that different external donors lead to polymers with different isotacticities and to polymers having different mechanical properties. One of the important mechanical properties is the flexural modulus. It is also known that the isotacticity can be affected to some extent by changing the concentration of the donor. This change in donor concentration influences the concentration of xylene-solubles of the polymer, which is usually not desired.

There are problems related to the known processes, when transitions from one polymer grade to another grade have to be made. It is often necessary to produce different polymer grades with the same process equipment. With prior art processes it is extremely difficult, and sometimes even impossible, to change over from one polymer grade to another by changing one polymer characteristic without affecting the other polymer characteristics. According to the prior art, the change in one feature or one component of the process tends to cause changes in other features, too. This means in practice that if one component or feature in a process for changing one property of the product is changed, then one or more other components of the process have to be changed, too, if the other properties of the polymer are to be kept unchanged. This is due to the fact that components of the process are so closely linked together that changes in one component mean changing the others, too. This is a great problem with present-day processes, where the transition of polymer grades having different stiffness, but a predetermined MFR has to be made.

As is stated above, different isotacticity levels require the use of different external donors. However, hydrogen response of the catalyst system is dependent on the type of external donors used. "Hydrogen response" or "hydrogen sensitivity" stands for the sensitivity of the molecular weight of the polymer to the hydrogen concentration. This means that if the external donor is changed, the hydrogen feed to the process needs to be recalculated and changed in order to meet the requirements for a specific level of melt flow rate. As far as the process is concerned, this causes extra work, time and costs.

Thus, in summary, according to known processes, when isotacticity and MFR of the polymer are modified, the donor needs to be changed and the hydrogen flow to the process needs to be altered. Even if only isotacticity is to be changed by changing the donor, also the hydrogen feed has to be changed due to the reasons explained above. Further, there is always a transitional period of time before the grade of the polymer product is changed from a first polymer grade to another, since conventional processes stabilize slowly after a change of donor and hydrogen feed. The material produced during the switching-over period between two grades often has to be discarded because it does not fulfil the quality requirements neither of the first nor of the second polymer. This is both an economical and an environmental disadvantage.

Until now, no method of transition from one polymer grade to another is known, wherein the hydrogen feed could be kept on the same level when an external donor is changed, in order to change the isotacticity, but to keep the MFR at the predetermined level. In practice, this means that there are no processes that would allow for facile transition from one polymer grade to another having different isotacticity but essentially the same MFR.

SUMMARY OF THE INVENTION

It is an aim of the present invention to eliminate the problems of the prior art and to provide a novel way of producing two or several grades of propylene polymers, including propylene homo- and copolymers, in one and the same polymerisation reactor system, while avoiding extended transitional periods between the change from one grade to another.

It is another object of the invention to provide a propylene polymerization process, where the control of isotacticity and MFR of the propylene polymer can be optimised during the production of propylene homopolymers and/or propylene copolymers comprising propylene random and heterophasic (block) copolymers.

Furthermore, a third object of the invention is to provide a process, where the sensitivity of the molecular weight of the polymer to the hydrogen concentration (i.e. hydrogen response or sensitivity of the catalyst) is increased. Such a process will provide for a novel means of controlling isotacticity of polypropylene polymers primarily only by using external donors.

These and other objects, together with the advantages thereof over known processes and products, are achieved by the present invention as hereinafter described and claimed.

The invention is based on the surprising finding that a specific, newly-developed kind of catalysts can be used for producing, at essentially the same polymerization conditions, different polymers having the same, predetermined level of MFR but different isotacticity. These new catalysts will allow for the same hydrogen response while using different external donors.

Typically, the catalysts comprise particles of Group 3 to 10 transition metal compounds, or an actinide or lanthanide, in combination with compounds or complexes of Group 2 metals, produced by solidification of particles from emulsion systems to produce catalyst particles having a desired particle size. In particular, the catalyst particles are obtained by forming a liquid-liquid emulsion system, which contains a homogeneous solution of the at least one catalyst component, said solution being dispersed in a solvent immiscible therewith and forming the dispersed phase of the liquid-liquid emulsion system, solidifying said dispersed droplets to form solid catalyst particles having a predetermined size range, and recovering said solid catalyst particles. The particles are "self-supporting" in the sense that they are not supported on any external carrier. An essential feature of the obtained catalyst is that the active sites of the catalyst are evenly distributed thorough the whole particles contrary to the normally used commercial supported ZN catalysts, where the surface of an external support is treated with the catalyst, whereby the active sites of the catalyst are concentrated only on the surface of the support or carrier.

These novel kinds of catalysts and their preparation are described in WO Publications Nos. 03/000754 and 03/000757, the contents of which are herewith incorporated by means of reference.

The above-described catalysts can, according to the present invention, now be used in a novel transition process for producing at least two different propylene polymer grades, in which process the isotacticity of the polymer is changed while keeping the melt flow rate of the polymer at a predetermined level during a transition of production—in particular continuous production—from a first polymer grade to a second, said process being carried out in a polymerization arrangement comprising at least one polymerization reactor, where propylene is polymerized, optionally with comonomers, under polymerization conditions in the presence of hydrogen as a molecular weight controlling agent and a Ziegler-Natta catalyst system, comprising a catalyst component and an external donor, wherein the external donor is changed, but the hydrogen feed is kept at a predetermined level, during a transition of production from the first polymer grade to the second.

In practice, the production of the first polymer grade is carried out in the presence of a catalyst system comprising a first external donor and the production of the second polymer grade is carried out in the presence of a catalyst system comprising a second (different) external donor. According to the invention, the change of the external donor comprises exchanging the first external donor for the second external donor.

The above-described catalysts can also be used in a process for producing at least two olefin polymers having essentially the same level of MFR but different isotacticity, by polymerizing the olefin monomers in the presence of the catalytic system and by maintaining the hydrogen feed at an essentially constant level during the production of at least the first and the second polymers.

Further, the catalysts provide for a process of controlling the isotacticity of polypropylene polymers by using external donors, in which process the isotacticity is adjusted by changing the external donor without changing the hydrogen feed and still maintaining the melt flow rate essentially at the same level.

More specifically, the process according to the present invention is mainly characterized by what is stated in the characterizing part of claims 1, 7 and 25.

The present invention provides important advantages. Thus, the present invention makes it faster and easier to control the overall process and especially to change from one polymer grade to another, while maintaining good control over the important properties, like MFR and isotacticity, of the polymer product. As pointed out above, with known processes, transfer from producing one polymer grade having a predetermined MFR level to produce another polymer grade having the same MFR level but different isotacticity is often difficult. The hydrogen feed has to be changed and this operation will lead to a lowered production rate in order to decrease the off-spec material, the amount of which might be undesired high in conventional processes. This is, as stated above, due to the fact that a change from one external donor to another leads to different hydrogen response and, thus, to necessary changes in hydrogen feed. This is, however, not necessary for the invention. On the contrary, it is an essential and important feature of the invention that the hydrogen feed can be maintained on essentially the same (predetermined or preset) level during the entire operation of the polymerization process comprising the change of the external donor for producing two or more polymers having different isotacticity but the same MFR.

Another great advantage is that the transition from one grade of polymer to another is faster and easier, because there is no need to alter the hydrogen feed to the process. In other words, the hydrogen feed curves do not have to be recalculated and reoptimized when the polymer grade is changed. There will be less rejected material that does not fulfil product requirements, because the target level of product properties is reached sooner. This is an advantage when thinking of both economical (lower operational cost) and environmental aspects. In addition to this, a broader product window can be reached much easier.

A further problem associated with prior art processes is that the final stages of product development are time-consuming and expensive. New grades have to be tested at real process conditions using real process equipment. With the help of the present invention, product development will be faster. Product development involves testing new polymer grades and often involves switching from one donor to another. With prior art processes, this means changing the hydrogen flow. With help of the present invention, the time requirement for the switch is shorter, because there is no need to alter the hydrogen feed to the process.

In polymerization processes, control systems play an important role. For prior art processes, there are many variables to control. One of them is the hydrogen feed, which usually needs to be altered when polymer grades are changed. The more variables there are to control, the more difficult it is to reach the desired properties when the variables are changed. In other words, there is more off grade produced. Also transition times are longer with additional parameters to be changed in product change. The present invention allows for easier control of the overall process because there is one variable less to control and may lead to lower investment cost.

With the aid of the present invention, it is possible to produce a wider product range or product window with the same process. By using the process of the present invention, it is possible to produce propylene polymers having a Melt Flow Rate ($MFR_2$) 0.01 to 1500 g/10, min or even higher, (measured by ISO Standard 1133, at 230° C., 2.16 kg load) and isotacticity in the range, which is normally obtainable by donors used in the propylene polymerization processes.

Hydrogen feed is maintained at essentially constant level, when making polymer with same MFR, but by using different external donor, i.e. the feed is independent on the donor. For the purpose of this invention, "essentially constant level" means that the volume of the hydrogen feed will change at the most 5% from the starting volume. The level of the hydrogen feed is chosen to produce polymers with desired MFR. Further details and advantages of the invention will become apparent from the following detailed description comprising a number of working examples.

DETAILED DESCRIPTION OF THE INVENTION

Overall Process

Figure 1:
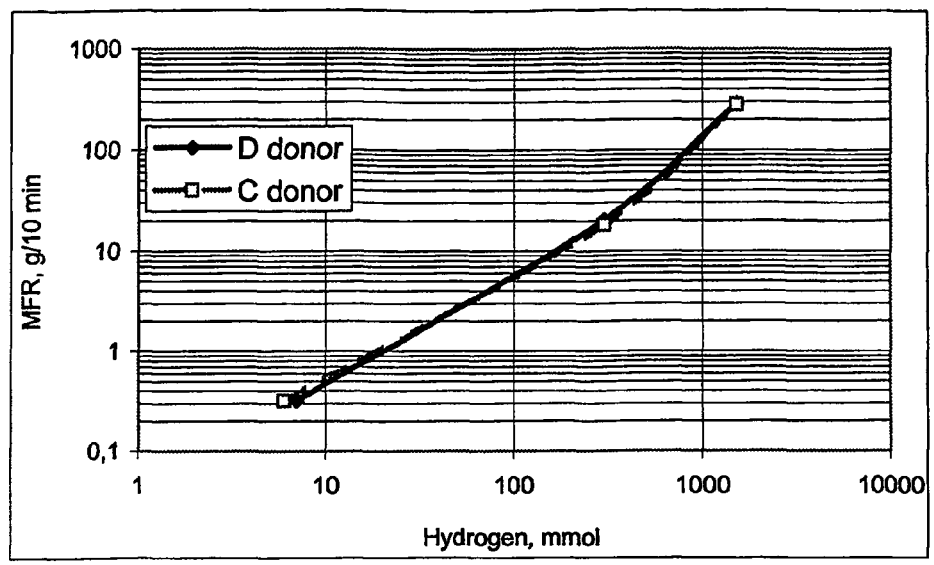
FIG. 1 depicts graphically the results of polymerization experiments disclosed in Examples 1, 2 and 5 according to the invention. The x-axis represents hydrogen flow and the y-axis $MFR_2$ of the polymer.

Generally, the present invention comprises the steps of producing a first polymer or polymer grade with a predetermined MFR and a first degree of isotacticity in the presence of said catalytic system using a first external donor; and a second polymer or polymer grade with essentially the same predetermined MFR and a second degree of isotacticity in the presence of said catalytic system using a second external donor. The second donor can be the same as or, preferably, different from the first donor.

The process steps can be performed in optional order and in a sequence one after another. The process can be a one stage or a multistage polymerization process carried out in liquid/slurry phase, gas phase or vapour phase in a sequence of polymerization steps comprising one or more liquid/slurry polymerization and/or one or more gas phase polymerization steps or combinations thereof in any order. The polymerization in each stage can be carried out in one or more reactors such as slurry/bulk polymerization reactors and or gas phase reactors. In one embodiment the polymerization is carried out in at least one bulk reactor, preferably loop reactor, followed by at least one gas phase reactor.

Polymers

The polymers produced with the process of the invention are propylene polymers comprising propylene homopolymers, propylene copolymers comprising propylene random and heterophasic (block) copolymers or combinations thereof.

The comonomers used are selected from the group of $C_{2-18}$ olefins, preferably $C_{2-10}$ olefins, such as ethylene, 1-butene, 1-pentene, 1-hexene, 4methyl-1-pentene, 1-heptene, 1-octene, 1-nonene and 1-decene as well as mixtures thereof and dienes, such as 1,5-hexadiene and 1,9-decadiene. Most commonly used comonomers are ethylene and 1-butene, especially ethylene.

By using the process of the present invention, it is possible to produce propylene polymers having a Melt Flow Rate ($MFR_2$) of 0.01 to 1500 g/10 min or even higher, preferably 0.1 to 500 g/10 min, in particular 10 to 300 g/min, (measured by ISO Standard 1133, at 230° C., 2.16 kg load). As examples of some particularly preferred ranges the following can be mentioned (measured as explained above): 20 to 200 g/min, 20 to 100 g/min, 50 to 150 g/min and 100 to 300 g/min, depending on the final application. FTIR Isotacticity (measured by FTIR, Fourier transform infrared spectra, $^{13}C$ NMR calibrated ) depends, as is well known, on the MFR of the polymer. As examples of the higher FTIR isotacticity-values of homoPP produced by the process of the invention are e.g. as follows: at $MFR_2$ of 0.3 g/10 min about 91%, at $MFR_2$ of 20 g/10 min about 99% and at $MFR_2$ of 300 g/10 min about 103%. Lower isotacticity (=higher XS), at a certain MFR-level, can be achieved by decreasing donor concentration or by using a weaker external donor in the polymerisation. However, changing the donor concentration will also change the hydrogen sensitivity of the catalyst system, which causes a need to alter also hydrogen feed. In this case, two changes in the process are needed. If the lower isotacticity is achieved by changing the external donor, only one change in the process is needed, because hydrogen sensitivity of the catalyst system does not change even if the external donor is changed.

According to the present invention, a smooth transition from one grade of polymer to another grade is now possible; polymers having the same MFR level, but different isotacticities can be obtained without changing the hydrogen feed from the polymerization of the first polymer to the following polymer(s). The process provides continuous polymerization of propylene monomers along with any possible comonomers using a catalyst having essentially the same hydrogen response independent on the used external donors. This means that the catalyst used exhibits the same hydrogen response and, thus, the MFR of the polymers will remain essentially unchanged, although different isotacticities are desired and obtained. As a result, the switch or transition from one grade to another will be facile and rapid, resulting in no or only minor losses in production output during the transition period.

According to an embodiment of the invention a first polymer is produced, having a predetermined MFR and a lower isotacticity and a second polymer is produced having the same MFR but a higher isotacticity. This sequence can be followed by a third and a fourth and several further polymers having even higher or again lower isotacticities than any of the previous polymers.

According to another embodiment, the isotacticity of the second polymer may be lower than that of the first polymer. This sequence can be followed by a third and a fourth and several further polymers having even lower or again higher isotacticities than any of the previous polymer.

Reactors

The polymerization reactor arrangement comprises one or more liquid/slurry/reactor(s), preferably bulk reactor(s), or one or more gas phase reactor(s), or combinations of any of these in any order. The reactors can be arranged in series. The polymerization may be carried out in several stages each comprising polymerizations in one or more reactors.

The first stage polymerization can be carried out in one or more bulk reactor(s), preferably loop reactor, or in one or more gas phase reactor(s). Typically, the reactors are connected in series. The second stage polymerization is preferably carried out in one or more gas phase reactor(s). The second stage polymerization is typically carried out essentially immediately after the first stage polymerization, i.e., the polymerization product recovered from the first polymerization stage is conducted to the first gas phase reactor of the second polymerization stage. The gas phase reactors in the second polymerization stage are preferably connected in series.

The polymerization temperature in the actual polymerizations is usually in the range of 60 to 110° C., preferably between 70 and 100° C., more preferably between 70 and 90° C. and most preferably between 70 and 85° C. The pressure in the slurry/bulk reactors, preferably in loop reactors is typically between 20 to 70 bar, preferably between 30 to 60 bar.

The pressure in the gas phase reactors is typically between 10 to 40 bar, preferably 15 to 30 bar.

According to one embodiment, the heterophasic propylene copolymer is produced in a reactor system comprising at least one liquid (bulk) reaction stage including at least one liquid (bulk) reactor, preferably at least one loop reactor, and at least one gas phase reaction stage including at least one gas phase reactor. The reactors are connected in series, the bulk reactors being preferably arranged before the gas phase reactors. A separation stage can be employed between the reaction stages or reactors to prevent the carryover of reactants from the one polymerization stage or reactor into another.

According to this embodiment the polymer matrix is produced in the first reaction stage, which is preferably a bulk reaction stage, and the heterophasic rubbery part is produced in the second reaction stage, which preferably is a gas phase reaction stage.

In addition to the actual polymerization reactors used, the polymerization reaction system can also include a number of additional reactors, such as prereactors. The prereactors include any reactor for preactivating and/or prepolymerizing the catalyst e.g. with propylene and/or other α-olefin(s) and/or ethylene, if necessary. In addition the polymerization system can contain some post-reactors for further modifying the produced polymer. All reactors in the reactor system are preferably arranged in series.

According to the invention, it is not necessary to change the hydrogen feed to keep the MFR of the polymer at the predetermined level, although adjustment of the isotacticity is aimed at, e.g. by changing the external donor used to another type of donor. I.e. the hydrogen feed can be maintained at an essentially constant level in the polymer transition process. For the purpose of this invention, "essentially constant hydrogen feed level" means that during the transition from a first polymer to another, the predetermined MFR can be maintained and the desired isotacticity of the second or further polymer can be reached without altering the volume of the hydrogen feed. Keeping the hydrogen feed essentially at the same level, means that it will be changed no more than 5%, preferably no more than 3%, most preferably no more than 2%, from the starting volume. The level of the hydrogen feed is chosen so as to enable production of a first polymer with a desired MFR and isotacticity and a second or following polymers with the same, predetermined MFR but different isotacticity.

The Catalyst

The catalyst system comprises a catalyst component, optionally a procatalyst component and a cocatalyst component, and an external donor.

The external donors used in the present invention are strongly coordinating donors, which form relatively strong complexes with catalyst surface, mainly with MgCl$_2$ surface in the presence of aluminium alkyl and TiCl$_4$. The donor components are characterised by a strong complexation affinity towards catalyst surface and a sterically large and protective hydrocarbon. Strong coordination with MgCl$_2$ requires oxygen-oxygen distance of 2.5 to 2.9 Å [Albizzati et al., Macromol. Symp. 89 (1995) 73-89].

Typically this kind of donors are silane-based donors having the structure of the general formula I

$$R'''_n Si(OMe)_{4-n} \qquad (I)$$

wherein R''' is a branched aliphatic or cyclic or aromatic group, Me stands for methyl and n is 1 or 2, preferably 2. [Härkönen et al., Macromol. Chem. 192 (1991) 2857-2863].

In particular, the external donor is selected from the group consisting of dicyclopentyl dimethoxysilane (donor D), cyclohexylmethyl dimethoxy silane (donor C), diisopropyl dimethoxysilane, methylcyclohexyldimethoxy silane, di-isobutyl dimethoxysilane, and di-t-butyl dimethoxysilane. Dicyclopentyl dimethoxysilane (donor D) and cyclo hexyl methyl dimethoxy silane (donor C) are particularly preferred. From these donors D and C, donor D has, according to common knowledge, a stronger coordinating effect than donor C.

The present catalyst system comprises catalyst particles, which, according to the present invention, are of a specific constitution in the sense that they are not supported on any external carrier contrary to the normally used commercial supported ZN catalysts. The active sites of the catalyst are evenly distributed throughout the whole particles and the particles are "self-supporting". Catalysts of this kind can be prepared as described in WO Publications Nos. 03/000754 and 03/000757.

In addition to the above-discussed features, the catalyst particles prepared according to the cited documents have excellent morphology and good, uniform particle size distribution and due to the replica effect the polymer particles produced by using these catalysts have very good morphology properties, too.

The olefin polymerization catalyst component used in the present invention, comprises a compound of a transition metal of Group 3 to 10 of the Periodic Table (IUPAC), or of an actinide or lanthanide, and is prepared according to a method comprising (a) forming a liquid/liquid two phase emulsion system, which contains a homogeneous solution of at least one catalyst component, said solution being dispersed in a liquid medium and forming the dispersed phase of the liquid/liquid emulsion system, (b) solidifying said dispersed droplets to form solid catalyst particles having a predetermined size range, (c) recovering the obtained solidified catalyst particles.

As regards the "predetermined size range", it should be noted that the catalyst particles usually have an average size in the range of 5 to 200 μm, preferably 10 to 100, more preferably 20 to 50 μm.

The catalyst component can include, in addition to said transition metal compound, also any additional cocatalyst(s) (e.g. additional transition metal compounds) and/or activators and/or poison scavengers) and/or any reaction product(s) of a transition compound(s) and a cocatalyst(s). Thus the catalyst may be formed in situ from the catalyst components in said solution in a manner disclosed in said references.

A preferred process for producing an ZN propylene polymerization catalyst component in the form of particles having a predetermined size range comprises preparing a solution of a complex of a Group 2 metal and an electron donor by reacting a compound of said metal with said electron donor or a precursor thereof in an organic liquid reaction medium; reacting said complex, in solution, with a compound of a transition metal to produce an emulsion, the dispersed phase of which contains more than 50 mol-% of the Group 2 metal in said complex; maintaining the particles of said dispersed phase within the average size range 5 to 200 μm by agitation preferably in the presence of an emulsion stabilizer and solidifying said particles; recovering and optionally washing said particles to obtain said catalyst component.

For said ZN catalyst particles, the compound of a transition metal is preferably a compound of a Group 4 metal. The Group 4 metal is preferably titanium, and its compound to be reacted with the complex of a Group 2 is preferably a halide. In a still further embodiment of the invention a compound of a transition metal can also be selected from Group 5 metals, Group 6 metals, Cu, Fe, Co, Ni and/or Pd. The complex of the Group 2 metal is preferably a magnesium complex.

The liquid medium used in the formation of the liquid/liquid two phase emulsion system is a medium being immiscible to the solution of at least one catalyst component at least to the extent that an emulsion can be formed.

In a preferred embodiment the process for producing catalysts used in the invention comprises: preparing a solution of magnesium complex by reacting an alkoxy magnesium compound and an electron donor or precursor thereof in a $C_6$-$C_{10}$ aromatic liquid reaction medium; reacting said magnesium complex with a compound of at least one four-valent Group 4 metal at a temperature greater than 10° C. and less than 60° C., to produce an emulsion of a denser, $TiCl_4$/toluene-insoluble, oil-dispersed phase having, Group 4 metal/Mg mol ratio 0.1 to 10 in an oil disperse phase having Group 4 metal/Mg mol ratio 10 to 100; maintaining the droplets of said dispersed phase within the size range 5 to 200 μm by agitation in the presence of an emulsion stabilizer while heating the emulsion to solidify said droplets and adding turbulence minimizing agent into the reaction mixture before solidifying said droplets of the dispersed phase, said turbulence minimizing agent being inert and soluble in the reaction mixture under the reaction conditions; and recovering the obtained olefin polymerization catalyst component. The recovering step comprises removal of the solvent from the mixture, which can be done e.g. by drying or by other means.

In the above, the term "oil-dispersed phase" means that the phase containing the catalyst component(s) is an oil-like liquid.

The turbulence minimizing agent (TMA) or mixtures thereof preferably comprises polymers having linear aliphatic carbon backbone chains, which might be branched with short side chains only in order to serve for uniform flow conditions when stirring. Said TMA is in particular preferably selected from α-olefin polymers having a high molecular weight of MW about 1–40×10$^6$, or mixtures thereof. Especially preferred are polymers of α-olefin monomers with 6 to 20 carbon atoms, and more preferably polyoctene, polynonene, polydecene, polyundecene or polydodecene or mixtures thereof, having the molecular weight and general backbone structure as defined before, and most preferable TMA is polydecene.

As electron donor compound to be reacted with the Group 2 metal compound is preferably an mono- or diester of an aromatic carboxylic acid or diacid, the latter being able to form a chelate-like structured complex. Said aromatic carboxylic acid ester or diester can be formed in situ by reaction of an aromatic carboxylic acid chloride or diacid dichloride with a $C_2$-$C_{16}$ alkanol and/or diol, and is preferable dioctyl phthalate, such as di-ethyl-hexyl phthalate. The liquid reaction medium preferably comprises toluene.

The reaction for the preparation of the Group 2 metal complex is generally carried out at a temperature of 20° to 80° C., and in case that the Group 2 metal is magnesium, the preparation of the magnesium complex is carried out at a temperature of 50° to 70° C.

The emulsion stabiliser is typically a surfactant, of which the preferred class is that based on acrylic polymers.

The alkoxy magnesium compound group is preferably selected from the group consisting of magnesium dialkoxides, complexes of a magnesium dihalide and an alcohol, and complexes of a magnesium dihalide and a magnesium dialkoxide. It may be a reaction product of an alcohol and a magnesium compound selected from the group consisting of dialkyl magnesiums, alkyl magnesium alkoxides, alkyl magnesium halides and magnesium dihalides. It can further be selected from the group consisting of dialkyloxy magnesiums, diaryloxy magnesiums, alkyloxy magnesium halides, aryloxy magnesium halides, alkyl magnesium alkoxides, aryl magnesium alkoxides and alkyl magnesium aryloxides.

The magnesium dialkoxide may be the reaction product of a magnesium dihalide such as magnesium dichloride or a dialkyl magnesium of the formula $R_2Mg$, wherein each one of the two R's is a similar or different $C_1$-$C_{20}$ alkyl, preferably a similar or different $C_4$-$C_{10}$ alkyl. Typical magnesium alkyls are ethylbutyl magnesium, dibutyl magnesium, dipropyl magnesium, propylbutyl magnesium, dipentyl magnesium, butylpentylmagnesium, butyloctyl magnesium and dioctyl magnesium. Most preferably, one R of the formula $R_2Mg$ is a butyl group and the other R is an octyl group, i.e. the dialkyl magnesium compound is butyl octyl magnesium.

Typical alkyl-alkoxy magnesium compounds RMgOR, when used, are ethyl magnesium butoxide, butyl magnesium pentoxide, octyl magnesium butoxide and octyl magnesium octoxide.

Dialkyl magnesium, alkyl magnesium alkoxide or magnesium dihalide can react with a polyhydric alcohol $R'(OH)_m$, or a mixture thereof with a monohydric alcohol $R'OH$.

Typical $C_2$ to $C_6$ polyhydric alcohols may be straight-chain or branched and include ethylene glycol, propylene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, and triols such as glycerol, methylol propane and pentareythritol. The polyhydric alcohol can be selected on the basis of the activity and morphology desired to the catalyst component.

The aromatic reaction medium may also contain a monohydric alcohol, which may be straight- or branched-chain. Typical $C_1$-$C_{20}$ monohydric alcohols are methanol, ethanol, n-propanol, iso-propanol, n-butanol, iso-butanol, sec.butanol, tert.butanol, n-amyl alcohol, iso-amyl alcohol, sec.amyl alcohol, tert.amyl alcohol, diethyl carbinol, akt. amyl alcohol, sec. isoamyl alcohol, tert.butyl carbinol. Typical $C_6$-$C_{10}$ monohydric alcohols are hexanol, 2-ethyl-1butanol, 4-methyl-2-pentanol, 1-heptanol, 2-heptanol, 4-heptanol, 2,4-dimethyl-3pentanol, 1-octanol, 2-octanol, 2-ethyl-1-hexanol, 1-nonanol, 5-nonanol, dilsobutyl carbinol, 1-decanol and 2,7-dimethyl-2octanol. Typical >$C_{10}$ monohydric alcohols are n-1-undecanol, n-1-dodecanol, n-1-tridecanol, n-1-tetradecanol, n-1-pentadecanol, 1-hexadecanol, n-1-heptadecanol and n-1octadecanol. The monohydric alcohols may be unsaturated, as long as they do not act as catalyst poisons.

Preferable monohydric alcohols are those of formula $R'OH$ in which R' is a $C_2$-$C_{16}$ alkyl group, most preferably a $C_4$-$C_{12}$ alkyl group, particularly 2-ethyl-1-hexanol.

Preferably, essentially all of the aromatic carboxylic acid ester is a reaction product of a carboxylic acid halide, preferably a dicarboxylic acid dihalide, more preferably an unsaturated α,β-dicarboxylic acid dihalide, most preferably phthalic acid dichloride, with the monohydric alcohol.

The finally obtained catalyst component is desirably in the form of particles having an average size range of 5 to 200 μm, preferably 10 to 100, more preferably 20 to 50 μm and the active sites of the catalyst are evenly distributed in the whole catalyst particle.

The catalyst used in the present invention comprises a catalyst component prepared as aforesaid, in association with commonly used cocatalysts, preferably alkyl aluminium compounds, more preferably aluminium trialkyls or aluminium alkyl halids, most preferably trialkyl alumninium, such as triethyl aluminium and external donors, and is used for the polymerization of propylene optionally with other monomers, such as $C_2$ to $C_{10}$-olefins.

Summarising what has been stated above, one particularly preferred embodiment of the invention comprises a process for controlling isotacticity of polypropylene polymers by using external donors, comprising feeding propylene together with optional comonomers along with hydrogen as a molecular weight controlling agent and a Ziegler-Natta catalyst system, including a catalyst component having as essential components Ti, Mg and Cl cocatalyst, and an external donor, into a polymerization reactor arrangement formed by at least one polymerization reactor and polymerizing propylene together with the optional monomers under polymerization conditions in order to obtain a polymer product having a predetermined melt flow rate and isotacticity, wherein isotacticity is adjusted by changing the external donor without changing the hydrogen feed and still maintaining the melt flow rate essentially at the same level.

The following non-limiting examples illustrate the invention in more detail:

EXAMPLES

In the examples, the following measurement methods were used:

| | |
|---|---|
| MFR (Melt flow rate): | ISO 1133, 230° C., 2,16 kg load |
| XS (Xylene solubles): | xylene soluble part at 25° C., ISO 6427 |
| $T_m$ (Melting temperature): | Differential scanning calorimetry, DSC, Mettler TA 820 |
| FTIR isotacticity: | Fourier tranformed infrared spectra, $^{13}$C NMR calibration |
| FLEXULAR MODULUS: | ISO 178 |

Example 1a

All raw materials were essentially free from water and air and all material additions to the reactor and the different steps were done under inert conditions in nitrogen atmosphere. The water content in propylene was less than 5 ppm.

The polymerization was done in a 5 litre reactor, which was heated, vacuumed and purged with nitrogen before taken into use. 348 µl TEA (triethyl aluminium from Witco used as received) as cocatalyst, 51 µl donor C (cyclo hexyl methyl dimethoxy silane from Wacker, dried with molecular sieves) and 30 ml pentane (dried with molecular sieves and purged with nitrogen) were mixed and allowed to react for 5 minutes. Half of the mixture was added to the reactor and the other half was mixed with 17.2 mg highly active and stereospecific Ziegler Natta catalyst (ZN catalyst). The ZN catalyst was prepared according to WO03/000754, example 7 and had Ti content 2.84 w-%. After about 10 minutes the ZN catalyst/TEA/donor C/pentane mixture was added to the reactor. The Al/Ti molar ratio was 250 and the Al/Do (Al/external donor) molar ratio was 10.

300 mmol hydrogen and 1400 g propylene were added to the reactor. The temperature was increased from room temperature to 70° C. during 20 minutes. The reaction was stopped, after 60 minutes at 70° C., by flashing out unreacted propylene. Finally, the polymer powder was taken out from the reactor and analysed and tested. The MFR of the product was 17. The details and results are shown in Table 1.

Example 1b

This example was carried out in accordance with Example 1a, with the exception that donor D (dicyclo pentyl dimethoxy silane) was used as external donor. The MFR of the product was 20, which is practically the same as that obtained with donor C in Example 1a. The details and results are shown in Table 1.

Example 2a

This example was carried out in accordance with Example 1a, with the exception that the amount of hydrogen was 1500 mmol. The MFR was 280 g/10 min. The details and results are shown in Table 1.

Example 2b

This example was carried out in accordance with Example 2a, with the exception that donor D was used as external donor. The MFR was 290, which is practically the same as with donor C in Example 2a. The details and results are shown in Table 1.

Example 3a

This example was carried out in accordance with example 1a, with the exception that Al/Do ratio was 50. The MFR was 31. The details and results are shown in Table 1.

Example 3b

This example was carried out in accordance with Example 3a, with the exception that donor D was used as external donor. The MFR was 30, which practically is the same as obtained with donor C in Example 3a. The details and results are shown in Table 1.

Example 4a

This example was carried out in accordance with Example 1a, with the exception that the temperature in polymerization was 80° C. The MFR was 24. The details and results are shown in Table 1.

Example 4b

This example was carried out in accordance with Example 4a, with the exception that donor D was used as external donor. The MFR was 23, which is practically the same as in Example 4a, where donor C was used. The details and results are shown in Table 1.

Example 5a

This example was carried out in accordance with Example 1a, with the exception that the amount of hydrogen was 6 mmol. The MFR was 0.32 g/10 min. The details and results are shown in Table 1.

Example 5b

This example was carried out in accordance with Example 5a, with the exception that donor D was used as external donor, hydrogen amount was 7 mmol and polymerization temperature was 75° C. The MFR was 0.32, which is practically the same as in example 5a, where donor C was used. The details and results are shown in Table 1.

TABLE 1

Results of Examples 1a to 5b

|  |  | Ex 1a | Ex 1b | Ex 2a | Ex 2b | Ex 3a | Ex 3b | Ex 4a | Ex 4b | Ex 5a | Ex 5b |
|---|---|---|---|---|---|---|---|---|---|---|---|
| Temperature | °C. | 70 | 70 | 70 | 70 | 70 | 70 | 80 | 80 | 70 | 75 |
| Hydrogen | mmol | 300 | 300 | 1500 | 1500 | 300 | 300 | 300 | 300 | 6 | 7 |
| Donor | type | C | D | C | D | C | D | C | D | C | D |
| Al/Do | mol/mol | 10 | 10 | 10 | 10 | 50 | 50 | 10 | 10 | 10 | 10 |
| Activity | kg PP/g cat h | 37.2 | 28.2 | 36.4 | 30.7 | 46.5 | 33.8 | 30.5 | 27.9 | 13.4 | 10.2 |
| MFR | g/10 min | 17 | 20 | 280 | 290 | 31 | 30 | 24 | 23 | 0.32 | 0.32 |
| XS | w-% | 1.6 | 1.2 | 2.4 | 1.6 | 3.1 | 2.3 | 1.5 | 1.3 | 2.3 | 2 |
| FTIR Isotacticity | % | 97.6 | 98.7 | 101.2 | 103 | 95.9 | 97.3 | 98.8 | 99.4 | 91.2 | 90.9 |
| Tm | °C. | 162 | 162.8 | 161.4 | 160.9 | 160.8 | 161.4 | 162.8 | 163.3 | 160.7 | 164.9 |
| Flexural modulus | Mpa | 1530 | 1660 | 1820 | 1800 | 1480 | 1550 | 1540 | 1640 | 1620 | |

Comparative Example 1a

This example was carried out in accordance with Example 1a, with the exception that the hydrogen amount was 13 mmol, polymerization temperature 80° C., donor D was used as external donor and a different catalyst was used. The catalyst used in this test was a transesterified $MgCl_2$ supported Ziegler Natta catalyst with Ti-content of 2.1% for producing high stiffness polypropylene products. The catalyst was prepared in accordance with Finnish patent No. 88047. The MFR of the polymer was 0.36. The details and results are shown in Table 2.

Comparative Example 1b

This example was carried out in accordance with Comparative Example 1a, with the exception that donor C was used as external donor. The MFR was 0.70, which is 100% higher than MFR in comparative example 1a, where donor D was used. The details and results are shown in Table 2.

Comparative Example 2a

This example was carried out in accordance with Comparative Example 1a, with the exception that the hydrogen amount was 200 mmol and polymerization time was 30 minutes. The MFR was 5.3. The details and results are shown in Table 2.

Comparative Example 2b

This example was carried out in accordance with Comparative Example 2a, with the exception that donor C was used as external donor. The MFR was 16.9, which is 300% higher than MFR in Comparative Example 2a, where donor D was used. The details and results are shown in Table 2.

Comparative Example 3a

This example was carried out in accordance with Comparative Example 1a, with the exception that the hydrogen amount was 1500 mmol. The MFR was 210. The details and results are shown in Table 2.

Comparative Example 3b

This example was carried out in accordance with Comparative Example 3a, with the exception that donor C was used as external donor. The OR was 470, which is 220% higher than MFR in Comparative Example 3a, where donor D was used. The details and results are shown in Table 2.

TABLE 2

Table 2. The Results of the Comparative Examples

|  |  | Comp. Ex 1a | Comp. Ex 1b | Comp. Ex 2a | Comp. Ex 2b | Comp. Ex 3a | Comp. Ex 3b |
|---|---|---|---|---|---|---|---|
| Time | min | 60 | 60 | 30 | 30 | 60 | 60 |
| Hydrogen | mmol | 13 | 13 | 200 | 200 | 1500 | 1500 |
| Donor | type | D | C | D | C | D | C |
| Productivity | kg PP/g cat | 21 | 18.8 | 23.8 | 18.7 | 38.9 | 29.2 |
| MFR | g/10 min | 0.36 | 0.70 | 5.3 | 16.9 | 210 | 470 |
| XS | w-% | 1.2 | 1.8 | 1.1 | 1.6 | 1.7 | 2.7 |
| FTIR Isotacticity | % | 96.9 | 94.6 | 100.4 | 98.8 | 104 | 103.7 |
| Tm | °C. | 168.5 | 165.1 | 165.8 | 163.3 | 161.3 | 160.2 |
| Flexural modulus | Mpa | 2050 | 1710 |  | 1600 | 1720 | 1770 |

Discussion of Results

Figure 2:
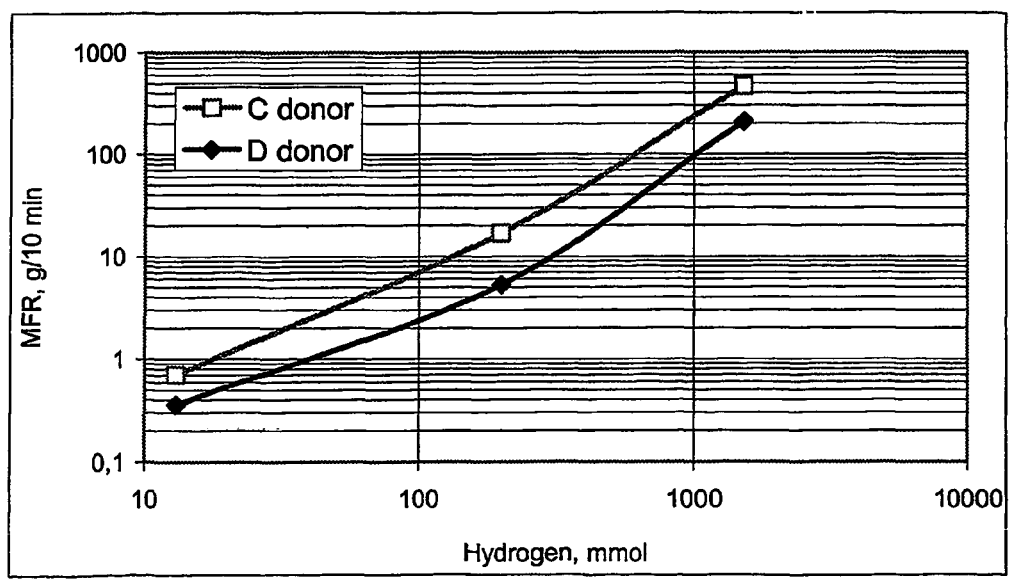
FIG. 2 depicts graphically the result of polymerization experiments of Comparative Examples 1, 2 and 3. The x-axis represents hydrogen flow and the y-axis $MFR_2$ of the polymer.

The difference between the catalyst behaviour used in the examples of the invention and the typical, supported Ziegler Natta catalyst used in the comparative examples is best seen in FIGS. 1 and 2. The catalyst used in the examples of the invention show no difference in hydrogen response independent on whether the external donor is donor C or donor D, FIG. 1. For the typical, supported Ziegler Natta catalyst used in the comparative examples, donor C gives 100-300% higher MFR than donor D at a certain hydrogen concentration, FIG. 2.

From Table 1 it is also evident that even if the catalyst in this invention shows the same hydrogen response for donor D and donor C (MFR values are essentially at the same level), the normal desired differences in polymer properties caused by using different donors, D and/or C, are maintained as was the target. Donor D gives clearly higher isotacticity, lower XS, higher $T_m$ and higher stiffness than donor C. The normal differences caused by using donor D and donor C can be seen also with the typical, supported Ziegler Natta catalyst used in the comparative experiments and summarized in Table 2. However, with the comparative catalysts, as can seen in Table 2, there are big variations between donor C and D in hydrogen response, which is shown by the huge differences between the MFR results, when the hydrogen feed is kept constant.

The invention claimed is:

1. A process for producing at least two different propylene polymer grades, which comprises polymerizing propylene, optionally with comonomers, under polymerization conditions in the presence of hydrogen as a molecular weight controlling agent and a Ziegler-Natta catalyst system, said catalyst system comprising a catalyst component, and an external donor selected from a first and a second external donor, wherein the first external donor is used for producing a first polymer grade and is changed to the second external donor for producing a second polymer grade, but the hydrogen feed is changed at the most 5% from the volume used for producing the first polymer grade, during the transition of production from the first polymer grade to the second; and wherein the catalyst system comprises solid catalyst particles which exhibit active sites evenly distributed throughout the particles; wherein the catalyst particles are not supported on an external carrier; wherein the isotacticity of the second polymer grade is different than that of the first polymer grade while keeping the melt flow rate of the first and second polymer at the same, predetermined level of 0.01 to 1500 g/10 min during a transition of production from the first polymer grade to the second; and wherein said process is carried out in a polymerization arrangement comprising at least one polymerization reactor.

2. The process according to claim 1, wherein the external donors are strong coordinating donors.

3. The process according to claim 1, wherein the external donors are selected from the group of silane base donors having the general formula

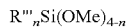

$R'''_n Si(OMe)_{4-n}$ wherein R''' is a branched aliphatic or cyclic or aromatic group, Me is methyl and n is 1 or 2.

4. The process according to claim 1, wherein the external donors are selected from the group consisting of dicyclopentyl dimethoxysilane (donor D), cyclohexylmethyl dimethoxy silane (donor C), diisopropyl dimethoxysilane, methylcyclohexyldimethoxy silane, di-isobutyl dimethoxysilane, and di-t-butyl dimethoxysilane.

5. The process according to claim 1, wherein the catalyst component of the catalytic system comprises a compound of a transition metal of Group 3 to 10 of the Periodic Table, or of an actinide or lanthanide, and is obtained by forming a liquid-liquid emulsion system, which contains a homogeneous solution of at least one catalyst component, said solution being dispersed in a liquid medium, and forming the dispersed phase of the liquid- liquid emulsion system, solidifying said dispersed droplets to form solid catalyst particles having a predetermined size range of 5 to 200 μm, and removing the solvent from the reaction mixture in order to obtain said solid catalyst particles.

6. The process according to claim 1, wherein the Ziegler-Natta catalyst system includes as a cocatalyst an alkyl aluminum compound.

7. The process according to claim 1, comprising:
a first polymer having a predetermined MFR and a first degree of isotacticity in the presence of said catalytic system using a first external donor; and
a second polymer having essentially the same predetermined MFR and a second degree of isotacticity in the presence of said catalytic system using a second external donor;
wherein the hydrogen feed is maintained at an essentially constant level during the polymerization.

8. The process according to claim 7, wherein the catalyst component of the catalytic system comprises a compound of a transition metal of Group 3 to 10 of the Periodic Table, or of an actinide or lanthanide, and is obtained by forming a liquid-liquid emulsion system, which contains a homogeneous solution of at least one catalyst component, said solution being dispersed in a liquid medium, and forming the dispersed phase of the liquid-liquid emulsion system, solidifying said dispersed droplets to form solid catalyst particles having a predetermined size range, and removing the solvent from the reaction mixture in order to obtain said solid catalyst particles.

9. The process according to claim 7, wherein the catalytic system comprises a catalyst component containing as essential components magnesium, titanium and halogen, a cocatalyst compound, and an external donor.

10. The process according to claim 7, wherein the catalyst component is used in the form of particles having an average size range of 10 to 100 μm.

11. The process according to claim 7, wherein the catalyst component is prepared according to a liquid-liquid two phase emulsion method comprising:
preparing a solution of a complex of a Group 2 metal and an electron donor or a precursor thereof in an organic liquid reaction medium,
reacting said complex, in solution, with at least one compound of a transition metal to produce an emulsion, the dispersed phase of which contains more than 50 mol-% of the Group 2 metal in said complex,
maintaining the droplets of said dispersed phase within the average size range 5 to 200 μm by agitation in the presence of an emulsion stabilizer and solidifying said droplets, and
recovering, washing and drying said particles to obtain said catalyst component.

12. The process according to claim 7, wherein the transition metal is a compound of a Group 4 metal.

13. The process according to claim 7, wherein the Group 2 metal is magnesium.

14. The process according to claim 7, wherein said organic liquid reaction medium comprises a $C_6-C_{10}$ aromatic hydrocarbon or a mixture of $C_6-C_{10}$ aromatic hydrocarbon and $C_5-C_9$ aliphatic hydrocarbons.

15. The process according to claim 7, wherein said emulsion is composed of
a dispersed phase which is $TiCl_4$/toluene-insoluble oil, having Group 4 metal/Mg mol ratio 0.1 to 10 and of
a disperse phase which is an oil less dense than the dispersed phase, having Group 4 metal/Mg mol ratio 10 to 100.

16. The process according to claim 7, wherein the propylene polymers are homopolymers, random copolymers, block copolymers or combinations thereof.

17. The process according to claim 7, wherein the hydrogen feed is changed at the most 2% from the volume used for producing the first polymer grade during the transition of the production from the first polymer grade to the second polymer grade.

18. The process according to claim 7, wherein the polymerization reactor arrangement comprises at least one reactor selected from liquid (slurry) reactors and gas or vapour phase reactors.

19. The process according to claim 18, wherein the polymerization reactor arrangement comprises a cascade of at least two reactors selected from liquid (slurry) reactors and gas or vapour phase reactor.

20. The process according to claim 18, wherein the slurry reactor is a loop reactor.

21. The process according to claim 7, comprising producing a propylene polymer having a Melt Flow Rate (MFR$_2$) of 0.01 to 1500 g/10min.

22. The process according to claim 21, comprising producing a propylene polymer having a Melt Flow Rate (MFR$_2$) of 10 to 300 g/min.

23. The process according to claim 21, wherein the isotacticity of the propylene polymer is above 95.

24. A process for controlling isotacticity of polypropylene polymers by using external donors, comprising feeding propylene together with optional comonomers along with hydrogen as a molecular weight controlling agent and a Ziegler-Natta catalyst system, including a catalyst component having as essential components Ti, Mg and Cl, a cocatalyst, and an external donor selected from a first and second external donor, into a polymerization reactor arrangement formed by at least one polymerization reactor and polymerizing propylene together with the optional monomers under polymerization conditions in order to obtain a polymer product having a predetermined melt flow rate and isotacticity, wherein isotacticity is adjusted by changing the external donor from the first external donor to the second without changing the hydrogen feed and still maintaining the melt flow rate essentially at the same level.

25. The process according to claim 24, wherein the catalyst system comprises solid particles, which exhibit active sites evenly distributed throughout the particles.

26. The process according to claim 25, wherein the catalyst particles contain no external carrier.

27. The process according to claim 24, wherein the catalyst component is used in the form of particles having an average size range of 10 to 100 μm.

28. The process according to claim 27, comprising producing a propylene polymer having a Melt Flow Rate (MFR$_2$) of 10 to 300 g/min.

29. The process according to claim 28, wherein the isotacticity of the propylene polymer is above 98.

* * * * *